United States Patent [19]

Nishioka et al.

[11] Patent Number: 5,936,152
[45] Date of Patent: Aug. 10, 1999

[54] SYSTEM FOR DETECTING FUNCTIONAL ABNORMALITIES OF IDLE SPEED CONTROL SYSTEM

[75] Inventors: Futoshi Nishioka; Katsuhiko Sakamoto; Hiroshi Takamatsu; Masanobu Kotoku, all of Hiroshima, Japan

[73] Assignee: Mazda Motor Corporation, Hiroshima, Japan

[21] Appl. No.: 08/889,153

[22] Filed: Jul. 7, 1997

[30] Foreign Application Priority Data

Jul. 5, 1996 [JP] Japan ................................. 8-176696
Jun. 17, 1997 [JP] Japan ................................. 9-160061

[51] Int. Cl.$^6$ ........................................... G01M 15/00

[52] U.S. Cl. .................................... 73/117.3; 73/118.1

[58] Field of Search .............................. 73/117.3, 118.1, 73/116, 112, 117.2, 118.2

[56] References Cited

U.S. PATENT DOCUMENTS

| 4,344,399 | 8/1982 | Matsumura et al. | 123/339 |
| 4,747,379 | 5/1988 | Oba | 123/339 |
| 5,408,871 | 4/1995 | Lieder et al. | 73/118.1 |
| 5,511,412 | 4/1996 | Campbell, III et al. | 73/118.1 |
| 5,614,666 | 3/1997 | Hara et al. | 73/118.1 |
| 5,715,726 | 2/1998 | Matsumoto et al. | 73/118.1 |

FOREIGN PATENT DOCUMENTS

7-77093  3/1995  Japan.

Primary Examiner—Richard Chilcot
Assistant Examiner—Eric S. McCall
Attorney, Agent, or Firm—Sixbey, Friedman, Leedom & Ferguson; Donald R. Studebaker

[57] ABSTRACT

Detection of abnormalities of an idle speed control system is performed based on whether a deviation of an on-idle engine speed from a target engine speed is within a critical range which is changed so as to make the idle speed control system harder to be judged abnormal when the engine is in a lapped state where the engine is apt to change speed than when in a green state where the engine is hardly changeable in speed.

14 Claims, 5 Drawing Sheets

SYSTEM FOR DETECTING FUNCTIONAL ABNORMALITIES OF IDLE SPEED CONTROL SYSTEM

BACKGROUND OF THE INVENTION

1. Field of the Invention

This invention relates to a system for monitoring and detecting an occurrence of abnormality of an idle speed control system for an automobile engine.

2. Description of Related Art

Typically, in diagnostic techniques for diagnosing malfunction or abnormalities of an idle speed control system for engines, diagnosis is carried out without judging the idle speed control system functionally normal immediately after the engine has attained an idle speed of rotation within a target range. This is based on consideration that the idle speed control system possibly encounters malfunctions or functional abnormalities even after a lapse of a certain time since the engine has attained a target idle speed of rotation. One of the techniques, which is known from, for example, Japanese Unexamined Patent Publication No. 7-77093, is available as an onboard malfunction diagnostic system to efficiently accumulate reliable diagnostic data.

The diagnostic technique described in Japanese Unexamined Patent Publication No. 7-77093 comprises a first timer to count a time passing from a point of time that the idle speed control system enters into a feedback control mode, a speed monitoring means to detect whether the engine attains a rotational speed within a specified range, and a second timer to count a time passing from a point of time that the engine attains a rotational speed within the specified range, and judges the idle speed control system normal in function on the basis that the time counted by the first timer is less than a specified time, and the time counted by the second timer reaches another specified time.

With the prior art diagnostic technique, in cases where, although the idle speed control system has a abnormality, the engine instantaneously attains a rotational speed within a specified target range, it is prevented to make, at the instantaneous attainment of a target speed of rotation, a wrong judgement that the idle speed control system is normal in operation. However, because the specific range of rotational speed for abnormality judgment is invariable, in cases where, although the idle speed control system is functionally normal, it is unavoidable to make such pretended judgment that the idle speed control system is functionally abnormal when the engine causes a deviant rise in rotational speed exceeding the specified range of rotational speed.

SUMMARY OF THE INVENTION

It is accordingly an object of the invention to provide an apparatus for detecting an occurrence of functional abnormalities of an idle speed control system for an automobile engine.

The foregoing object of the invention is accomplished in abnormality detection of an idle speed control system installed in an vehicle based on a deviation of an engine speed from a target engine speed while an engine runs idle by judging whether the engine is in a lapped state where the engine is apt to cause a change in speed or in a green state where the engine is hardly changeable in speed, changing a critical condition, specified for judging functional abnormalities of the idle speed control system for said green state, so as to make functional abnormalities of the idle speed control system harder to be judged when the engine is in said lapped state than when in said green state, and judging the idle speed control system functionally abnormal when the speed deviation is out of the critical condition. Specifically, the engine may be judged to be in the lapped state when the vehicle covers a specified critical mileage since shipment of the vehicle and to be in the green state when the vehicle uncovers the specified critical mileage since shipment of the vehicle.

In the abnormality detection, it may be done to detect of an engine operating circumstance where vapors are apt to easily occur in fuel to be delivered to the engine, and to change a condition for execution of the abnormality detection so as to make functional abnormalities of the idle speed control system harder to be judged when the engine operating circumstance is detected. The abnormality detection may practically be interrupted for a specified period of time at engine start-up when an engine operating circumstance where vapors are apt to easily occur in fuel to be delivered to the engine is detected. This specified period of time is changed longer when there appears such an engine operating circumstance than when there is no such a circumstance. Further, it may be done to detect an external load imposed on the engine, and to interrupt the abnormality judgment when the external load is detected.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 1:
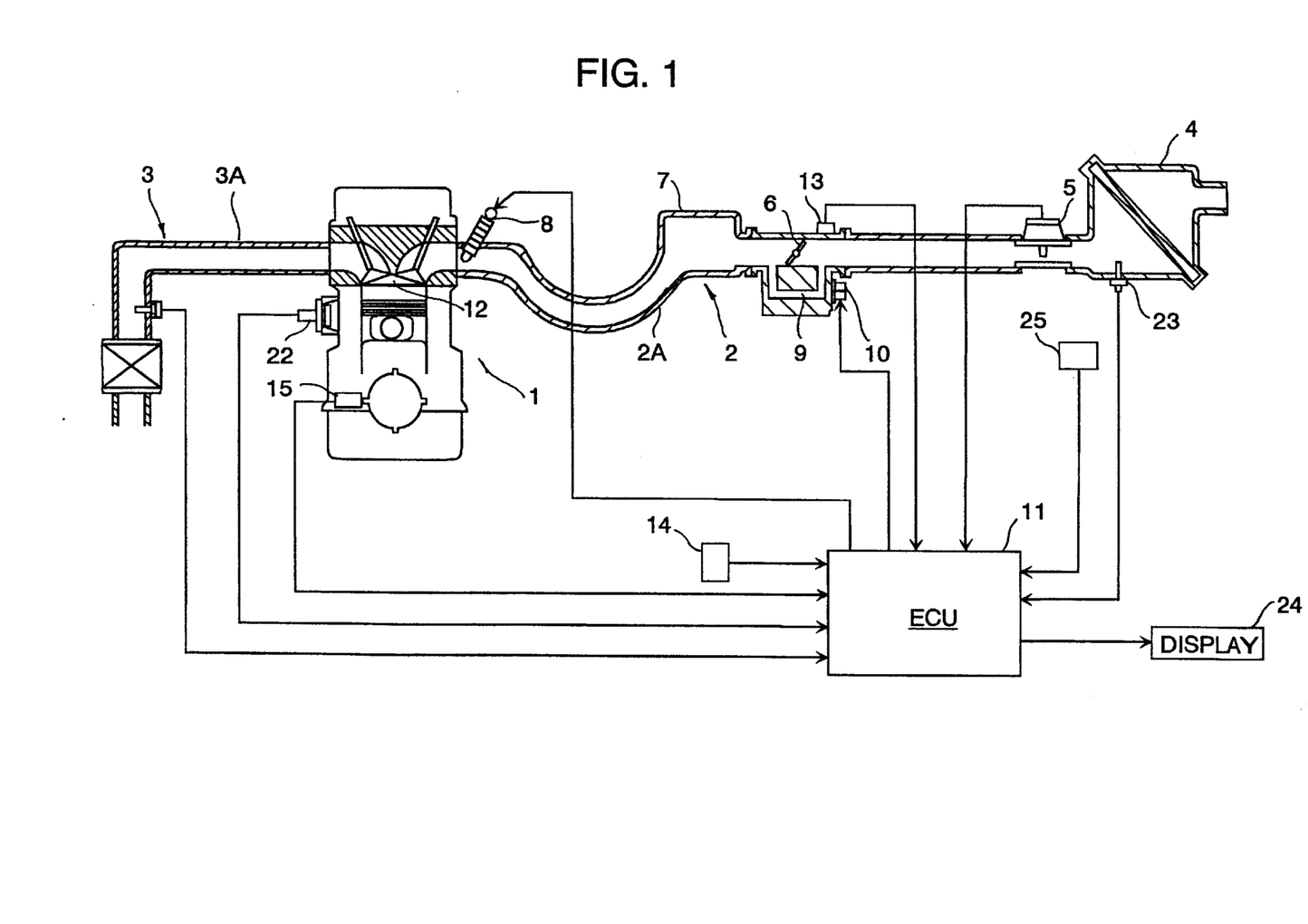
FIG. 1 is a schematic illustration of an engine provided with an idle speed control system having a feature of abnormality detection.

Referring to the drawings in detail, particularly to FIG. 1 which shows an engine 1 provided with an idle speed control system having a feature of monitoring and detecting functional abnormalities of the idle speed control system in accordance with an embodiment of the invention, the engine 1 has an intake system 2 and an exhaust system 3. The intake system 2 has an intake pipe 2A provided, in order from the upstream end, with an air cleaner 4, an air flow sensor 5, a throttle valve 6, a surge tank 7, and a fuel injector 8. The intake pipe 2A is formed with a bypass pipe 9 to allow air to flow through the intake pipe 2A bypassing the throttle valve 6. The bypass pipe 9 is provided with an idle speed control valve 10 for controlling the rotational speed of the engine 1 while the engine 1 runs idle with the throttle valve 6 turned closed. This idle speed control valve 10 is controlled in opening by an engine control unit (ECU) 11 to regulate the amount of intake air passing therethrough and entering into combustion chambers 12 of the engine 1 so that the engine 1 attains a target speed. Various types of intake systems and exhaust systems are well known and these intake system 2 and exhaust system 3 may take any type well known to those skilled in the art.

Figure 2:
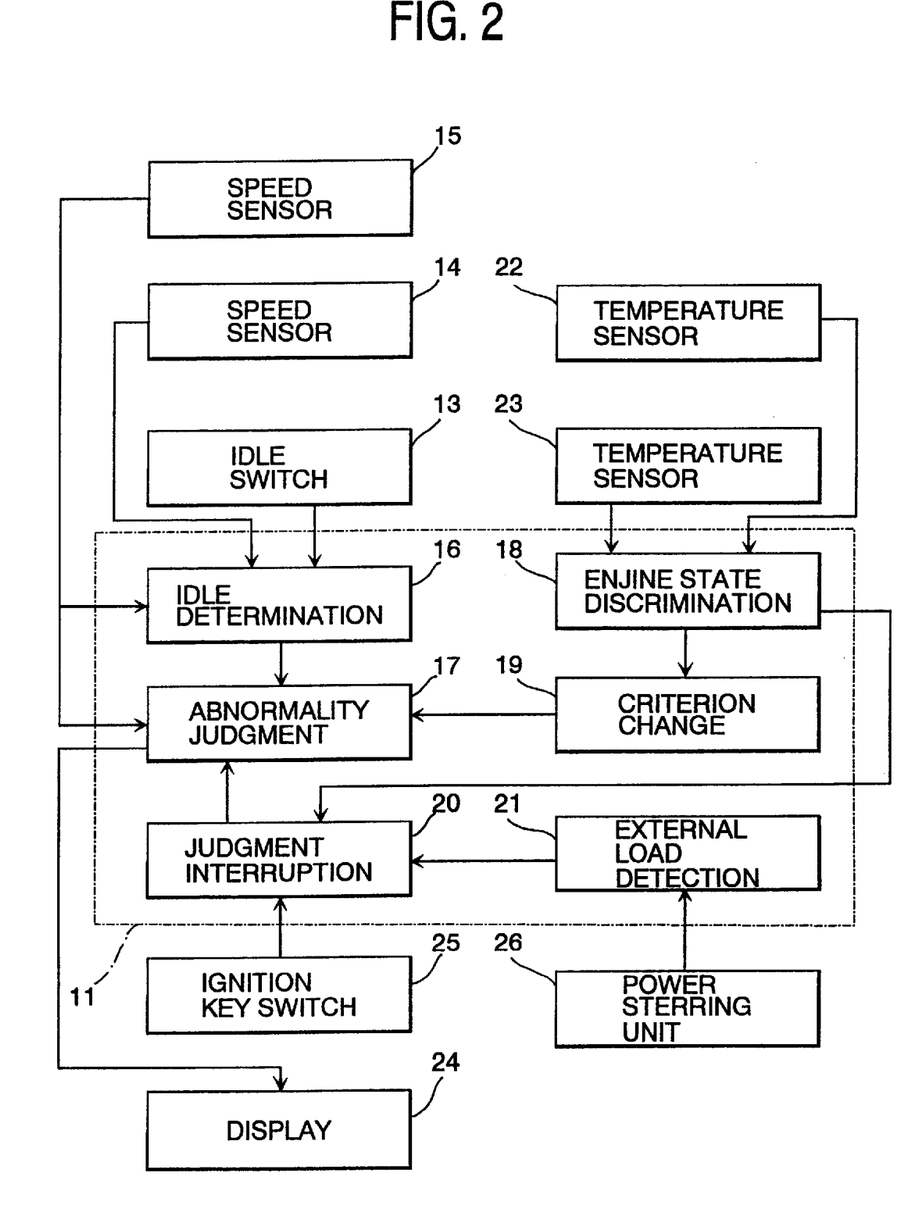
FIG. 2 is an explanatory block diagram showing a conceptual construction of the abnormality detection system for the idle speed control system in accordance with an embodiment of the invention.

Referring to FIG. 2 schematically and conceptually showing the engine control unit (ECU) 11, signals are transferred from various sensors and switches such as an idle switch 13, a speed sensor 14 for monitoring a vehicle speed, a speed sensor 15 for monitoring a rotational speed of the engine 1, temperature sensors 22 and 23 for monitoring the temperature of engine cooling water and intake air respectively. Further, signals are transferred from an ignition switch 25 and a power steering control unit 26. The idle switch 13 is installed in connection with the throttle valve 6 to provide an idle signal when the throttle valve 6 is in its closed position. The engine control unit (ECU) 11 performs a diagnosis of idle speed control as well as engine operation control and displays an indication of abnormalities in the idle speed control on a monitor display 24.

Figure 3:
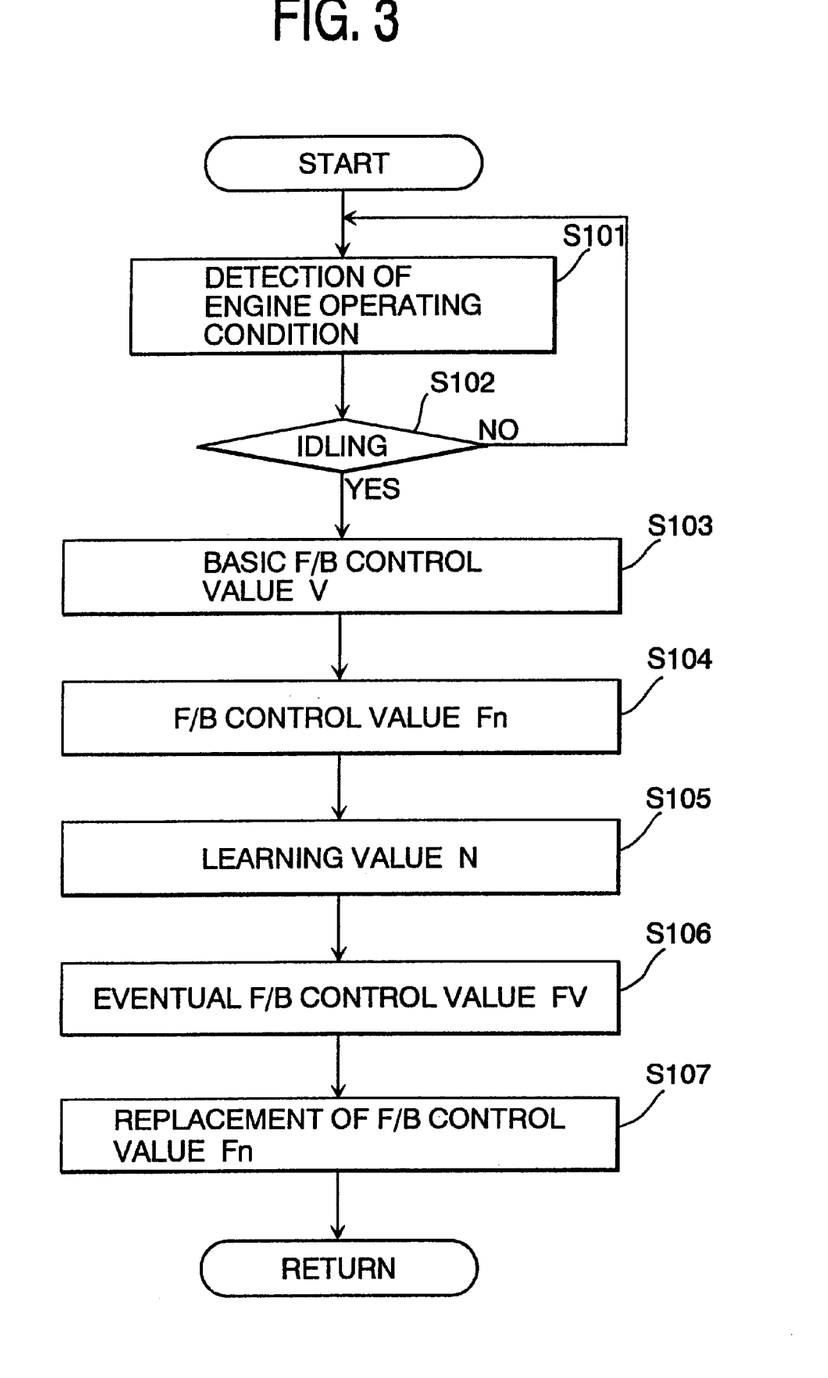
FIG. 3 is a flow chart illustrating a sequence routine of idle speed feedback control.

Engine control unit (ECU) 11 performs idle speed control at function block 16 on condition that, while the vehicle parks with the engine 1 running idle, the idle switch 13 provides an idle signal, and follows a sequence routine illustrated by a flow chart in FIG. 3.

Figure 4:
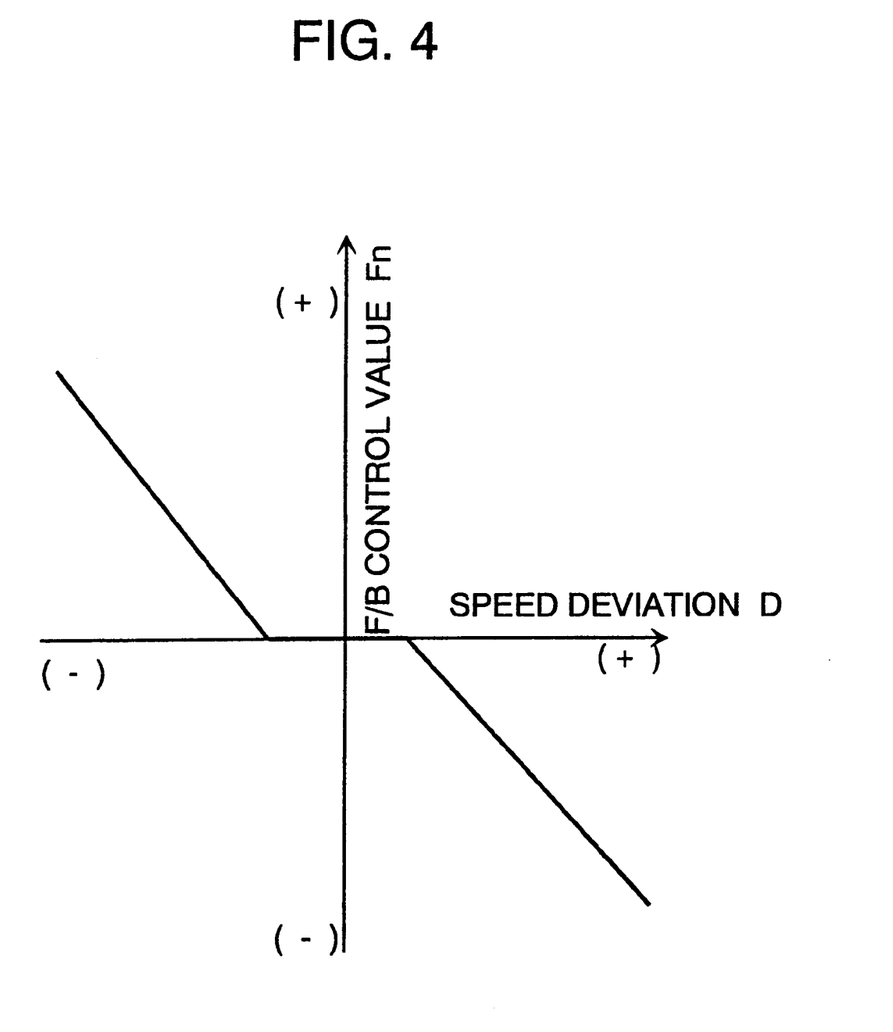
FIG. 4 is a graphical diagram showing the relationship between a feedback control value and a speed deviation between an on-idle engine speed and a target engine speed.

As shown in FIG. 3, when the flow chart logic commences and control passes directly to a function block at step S101 where signals from various switches and sensors are read in to detect an engine operating condition. At step S102, a determination is made based on the engine operating condition as to whether the engine 1 runs idle. When the engine 1 runs idle, a basic control value V which is used to determine an eventual feedback control value FV for controlling the idle speed control valve 10 later is determined at step S103. Subsequently, at step S104, a feedback control value Fn is determined with reference to a feedback value control map such as shown in FIG. 4. This feedback value control map defines the feedback control variable Fn with respect to a speed deviation D of an on-idle engine speed from a target engine speed. At step S105, a learning value N which is used to determine the eventual feedback control value FV later is computed by averaging a specified number (n) of preceding weighted feedback control values Fn including the latest one determined at step S104 by the method of moving average. For example, letting a1, a2, . . . , an be weighting coefficients for feedback control values Fn, Fn-1, . . . , F1, respectively, the learning value N is given as a moving average of the weighted feedback control values Fn, Fn-1, . . . , F1 and computed by the following equation:

$$N=(a1Fn+a2Fn\text{-}1+ \ldots +anF1)/(a1+a2+ \ldots +an)$$

At step S106, computation is made to determine the sum of the basic control value V, the feedback control value Fn and the learning control value N as an eventual feedback control value FV with which the idle speed control valve 10 is practically controlled in opening. Finally, at step S107, the latest feedback control value Fn is stored in place of the previous feedback control value Fn.

While the engine 1 runs idle, the engine control unit (ECU) 11 performs various functions such as abnormality detection, engine state discrimination, correction in judgment criterion for functional abnormalities of the idle speed control system, interruption of abnormality detection, and external load detection, performed at functional blocks 17–21, respectively. Specifically, the abnormality detection of the idle speed control system is performed at a functional block 17 to detect functional abnormalities of the idle speed control system including the idle speed control valve 10 based on a deviation D of an on-idle engine speed from a target engine speed. The judgment criterion correction is performed at functional block 19 to alter a judgment criterion for functional abnormalities. Performed at function block 20 is interruption of the abnormality detection of the idle speed control system performed at the function block 17. Detection of an external load imposed on the engine 1 such as action of a power steering unit (not shown) is made at function block 21.

In the abnormality detection of the idle speed control system performed at function block 17, when it is ascertained at function block 16 that the engine 1 runs idle, a computation is made to find the speed deviation D between an on-idle engine speed detected by the speed sensor 15 and a target engine speed which is specified to be approximately 700 rpm and altered according to the temperature of engine cooling water, and a determination is made as to whether the speed deviation D is within limits of the judgment criterion for functional abnormalities. In the event where the engine 1 continuously operates in a condition that the speed deviation D remains out of the limits of the judgement criterion for a specified period of time, it is decided that the idle speed control system encounters a functional abnormality. A sign effecting an indication of the functional abnormality is displayed on the monitor display 24.

At function block 18 where the engine state is detected, a determination is further made based on the temperature of engine cooling water detected by the temperature sensor 22 and the temperature of intake air in the intake pipe 2A detected by the temperature sensor 23 as to whether or not there is caused a state of an easy occurrence of fuel vapors in which bubbles form in fuel in a fuel passage (not shown) and the fuel injector 8. Further, it is determined based on the learning value N computed during execution of the idle speed control whether the engine 1 is in a green or steadfast state or in a lapped or aging state. The term "green" state as used herein refers to the state where cumulative vehicle mileage covered since shipment of the vehicle is less than a specified critical mileage, and the term "lapped" state as used herein refers to the state where the cumulative vehicle mileage covered since shipment of the vehicle is over the specified critical mileage. Specifically, the idle speed control is performed by the idle speed control system based on the eventual feedback control value FV which is obtained by adding the basic control value V, the feedback control value Fn depending upon the speed deviation D of an engine speed from a target engine speed, and the learning value N obtained as a weighted moving average of a specified number (n) of feedback control values Fn together. After the transition of the engine 1 from the green or steadfast state to the lapped or aging state, the engine 1 have a trace of increasing speed due, for example, to a decline in resistance of bearings for an engine output shaft (not shown). For that reason, in order for the engine 1 to maintain speed constant, the learning value N for the idle speed control is apt to shift in such a minus direction as to decrease the amount of intake air passing through the bypass pipe 9. Therefore, the determination as to whether the engine 1 has turned from the green state to the lapped state is effected by means of judgment as to whether the learning value N turns minus and exceeds a specified critical value at function block 18. It may be done based on a signal from a memory storing cumulative vehicle mileage to judge whether the cumulative vehicle mileage covered since shipment of the vehicle is above the specified critical mileage.

The judgement criterion for functional abnormality judgment of the idle speed control system is altered at functional block 19 in such a direction as to make judgment of functional abnormalities of the idle speed control system lenient more when the engine 1 is in the lapped state than when it is in the green state. Specifically, when the engine 1 is ascertained to be in the lapped state, The judgement criterion is altered to increase its upper extremity so as to make it hard to judge functional abnormalities of the idle speed control system even when the speed deviation D turns somewhat greater.

At function block 20, the abnormality detection is interrupted for a specified period of time from a point of time at which a signal is output from the ignition key switch 25 to start the engine 1 and, additionally, interrupted when an external load imposed on the engine 1 is detected at function block 21. Further, when it is ascertained at function block 20 that there is the state of an easy occurrence of fuel vapors, the interruption period of time is prolonged so as to delay execution of the abnormality detection of the idle speed control system. Specifically, in the event where, while the temperature sensors 22 and 23 detect relatively high temperatures of engine cooling water and intake air, respectively, it is ascertained that there is the state of an easy occurrence of fuel vapors in which bubbles form in fuel in the fuel passage and the fuel injector 8, the interruption period of time is changed to approximately 120 seconds from approximately 5 seconds which is initially established for ordinary conditions. Detection of an external load imposed on the engine at function block 21 is made based on a control signal provided from, for example, the power steering control unit 26. When an external load such as action of the power steering unit 26 imposed on the engine 1 is detected, a command signal is generated at function block 20 to interrupt the abnormality detection at function block 17.

Figure 5:
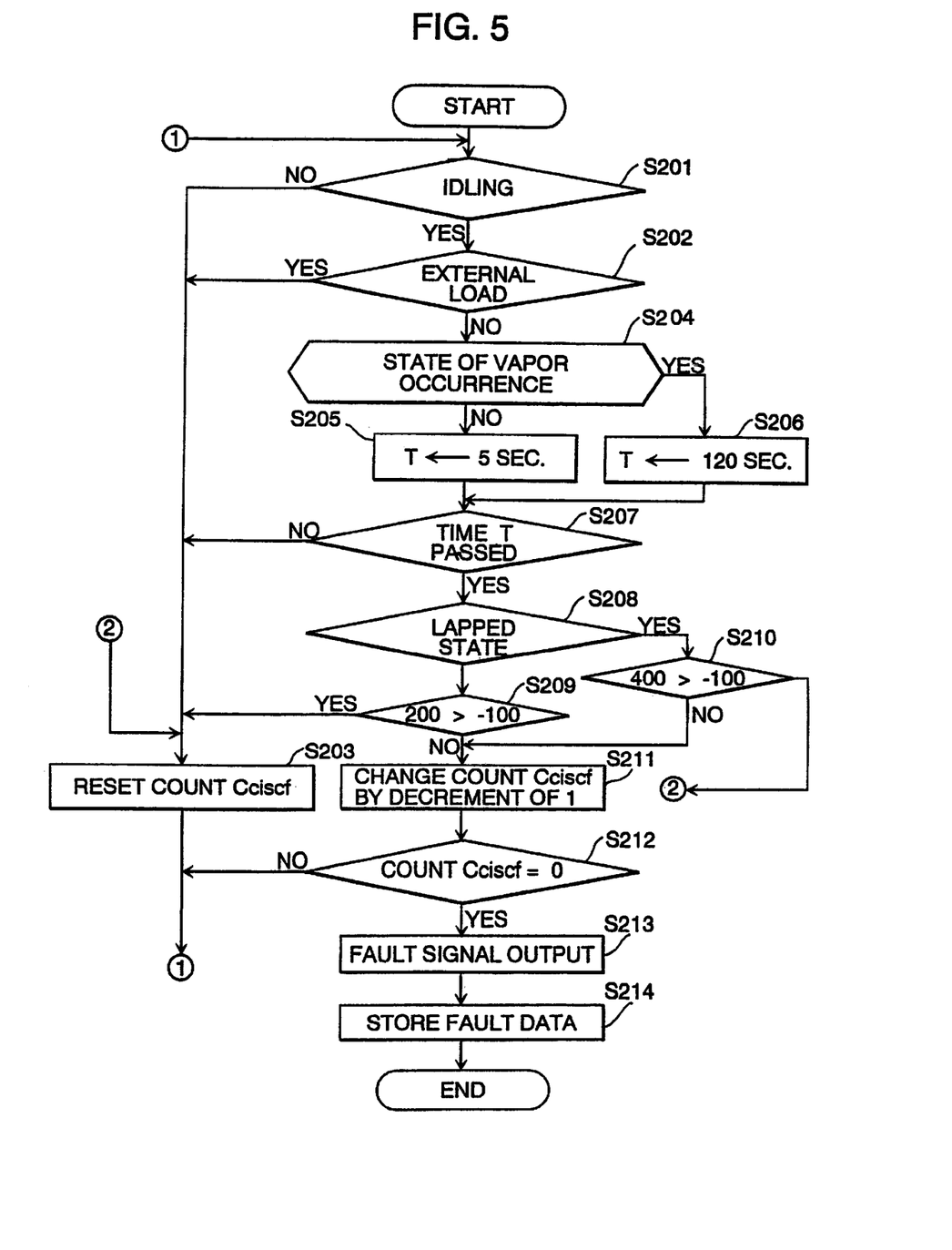
FIG. 5 is a flow chart illustrating a sequence routine of abnormality detection of the idle speed control system.

The operation of the apparatus for monitoring and detecting functional abnormalities of the idle speed control system will be best understood by reviewing FIG. 5 which is a flow chart illustrating a sequence routine of the abnormality detection of the idle speed control system. When the flow chart logic commences and control passes directly to step S201 where a determination is made based on an idle signal from the idle switch 13 as to whether the engine 1 runs idle. When the engine 1 runs idle, another determination is made at step S202 as to whether action of the power steering unit 26 is imposed as an external load on the engine 1. When the engine 1 is out of idle and/or applied with an external load, this indicates that it is not necessary to execute the abnormality detection of the idle speed control system, then, after resetting an monitor counter to its initial count Ciscf at step S203, the flow chart logic returns to step S201 and restarts the sequence routine. On the other hand, when the engine 1 is free from action of the power steering unit 26 an external load, a determination is subsequently made at step S204 as to whether there is the state of an easy occurrence of fuel vapors. This determination is made based on temperatures detected by the temperature sensors 22 and 23. Specifically, when the temperature of engine cooling water and the temperature of intake air are higher than specified levels, respectively, it is determined that the state of an easy occurrence of fuel vapors has occurred. In the event where there is an absence of the state of an easy occurrence of fuel vapors, the interruption period of time T is set to the ordinary time of, for example, approximately 5 seconds at step S205. In other cases, the interruption period of time T is extended to, for example, approximately 120 seconds at step S206.

At step S207, a determination is made as to whether the interruption period of time T has passed. Until the interruption period of time T passes, after resetting an monitor counter to its initial count Ciscf at step S203, the flow chart logic returns to step S201 and restarts the sequence routine. At a point of time that passage of the interruption period of time T is ascertained at step S207, a determination is made at step S208 as to whether the engine 1 is in the lapped state. As was previously described, the engine 1 is determined to be in the lapped state from the fact that the learning value N for control of the idle speed control valve 6 turns minus and exceeds the specified critical value. When the engine 1 is not in the lapped state but in the green state, this indicates that the idle speed control system remains appropriately tuned at the factory immediately before shipment of the vehicle, and hence the engine 1 is controllable to attain a target engine speed, then, a determination is subsequently made at step S209 as to whether the speed deviation D of an on-idle engine speed from the target engine speed is within the limits of judgment criterion between 200 and –100 rpm. On the other hand, when the engine 1 is in the lapped state, this indicates that the engine 1 possibly causes a rise in speed due, for example, to a decline in resistance of the bearings for the engine output shaft, then, a determination is subsequently made at step S210 as to whether the speed deviation D of an on-idle engine speed from the target engine speed is within the limits of judgment criterion between 400 and –100 rpm. Determination at step S209 or S210 is made with the result of detecting functional abnormalities of the idle speed control system. That is, the idle speed control system is judged normal when the speed deviation D is within the limits of judgment criterion between 200 and –100 rpm. or 400 and –100 rpm. Whenever the idle speed control system is judged normal, after resetting an monitor counter to its initial count Ciscf at step S203, the flow chart logic returns to step S201 and restarts the sequence routine. However, if it is determined at step S209 or S210 that the speed deviation D is out of the limits of judgment criterion, this indicates that the idle speed control system encounters a fault for some reasons, then, after changing the count Ciscf of the monitor counter by a decrement of one at step S211, a determination is made at step S212 as to whether the monitor counter has counted down to zero. When the count Ciscf is counted down, this indicates that the speed deviation D remains continuously out of the limits of judgment criterion for a specified period of time which is measured by the monitor counter, i.e. that the idle speed control system encounters a fault for some reasons, then, a fault signal is provided to display a sign effecting an indication of the fault on the monitor display 24 at step S213. After storing data relating to the fault at step S214, the flow chart logic goes to end.

As described above, in the abnormality detection of the idle speed control system based on the speed deviation D of an on-idle engine speed from a target engine speed, the condition for execution of the abnormality detection is changed in such a direction as to make judgment of functional abnormalities of the idle speed control system lenient more when the engine 1 is in the state where the engine 1 is apt to change its speed than when it in the state where the engine 1 is hardly changeable in speed. Accordingly, the abnormality detection of the idle speed control system is easy and definite in spite of the cumulated time of operation of the engine 1. The interruption period of time T for which the abnormality detection is interrupted at engine start-up is extended longer in the state of an easy occurrence of fuel vapors than when there is an absence of the state of an easy occurrence of fuel vapors, the abnormality detection is certainly prevented from ending in failure due to a reduction in the amount of injected fuel which results from bubbles generated in fuel in the fuel injector. In other words, in cases where, while engine cooling water and intake air are at high temperatures and there is an absence of the state of an easy occurrence of fuel vapors, the condition for execution of the abnormality detection is changed so as to extend the interruption period of time T longer at engine start-up as compared with the ordinary state until a change in engine speed caused due to the occurrence of vapors is suppressed. By means of this, the abnormality judgment is interrupted in the engine operating circumstances where the speed deviation D of an engine speed from a target engine speed is increased due to the occurrence of vapors. Furthermore, the interruption of the abnormality detection is released at a point of time that the change in engine speed is suppressed after passage of the extended interruption period of time T, enabling the abnormality detection of the idle speed control system to be reliably performed. Accordingly, it is eliminated that wrong detection is encountered although the idle speed control system operates normally. While the elimination of wrong detection of the idle speed control system may be done by means of altering the limits of the judgment criterion for the abnormality detection at functional block 19 in such a direction as to make judgment of functional abnormalities of the idle speed control system lenient when there is in the state of an easy occurrence of vapors, the previous embodiment is more preferable.

By means of extending the upper limit of the judgment criterion larger when the cumulative vehicle mileage exceeds a specified critical mileage than it is less than the specified critical mileage, the abnormality detection of the idle speed control system is performed suitably according to cumulative vehicle mileage. In other words, when it is ascertained that the engine is in the green state where the idle speed control system remains appropriately tuned at the factory immediately before shipment of the vehicle and the engine is consequently controlled to develop definitely a target engine speed, the upper limit of the detection criterion is restored as before with the result of performing the abnormality detection promptly and definite. In the event where, in order to prevent the engine 1 from halting during idling, the idle speed control system is adapted to suppress a decline in on-idle engine speed, the engine 1 is apt to cause an easy increase in speed in the lapped state due to changes in engine operating condition such as a decline in resistance of the bearings for the engine output shaft. For this reason, the upper limit of the abnormality detection is extended with the result of elimination of wrong detection of functional abnormalities of the idle speed control system which may be caused due to an increase in engine speed resulting from the change in engine operating condition.

Furthermore, when, while the engine 1 runs idle, the engine 1 receives action of, for example, the power steering unit as an external load, the abnormality detection of the idle speed control system is interrupted, so as to eliminate wrong detection of the idle speed control system possibly caused due to a decline in engine speed resulting from the imposition of an external load on the engine 1. As a result, the abnormality detection of the idle speed control system is always definite or precise in the state that the engine is free from changes in engine speed. In the case where the idle speed feedback control is performed with use of a leaning value N for control of the idle speed control, the lapped state of the engine 1 is detected based on the fact that the learning value N turns minus and exceeds a specified critical value, so that, while there is no requirement of a special detection means, the detection of the lapped state is prompt and well-suited.

Although, in the previous embodiment, only the upper limit of the judgment criterion for the abnormality detection is extended when the engine 1 has changed from the green state to the lapped state, it may be done to change both upper and lower limits of the judgement criterion. Furthermore, the condition for execution of the abnormality detection of the idle speed control system may be changed on the ground that the engine is apt to change its speed when atmospheric pressure is lower than a specified level. In this modification, wrong abnormality detection of the idle speed control system is eliminated even during traveling on highlands where the engine is apt to cause a decline in speed due to low atmospheric pressure.

It is to be understood that the present invention may be embodied with various changes, modifications and improvements, which may occur to those skilled in the art, without departing from the spirit and scope of the invention defined in the following claims.

What is claimed is:

1. An abnormality detection system for detecting abnormalities of an idle speed control system installed in a vehicle, said idle speed control system performs feedback control with a control value corrected based on a deviation of an on-idle engine speed from a target engine speed while an engine runs idle so as to develop said target engine speed, said abnormality detection system comprising:

a speed sensor for detecting an engine speed; and judging means for detecting a discrimination value relating to said deviation, discriminating a specified engine state where a cumulative vehicle mileage covered since shipment of the vehicle is greater than a specified mileage, and judging the idle speed control system functionally abnormal when said discrimination value is out of a critical range;

said critical range being initially specified for judging abnormalities of the idle speed control system for the engine out of said specified engine state and being extended to make judgement of abnormalities of the idle speed control system harder to occur when said specified engine state is discriminated.

2. An abnormality detection system as defined in claim 1, wherein said cumulative vehicle mileage since shipment of the vehicle is determined based on a learned value while said idle speed control system performs said feedback control.

3. An abnormality detection system for detecting abnormalities of an idle speed control system installed in a vehicle, said idle speed control system performs feedback control with a control value corrected based on a deviation of an on-idle engine speed from a target engine speed while an engine runs idle so as to develop said target engine speed, said abnormality detection system comprising:

a speed sensor for detecting an engine speed; and judging means for detecting a discrimination value relating to said deviation, discriminating a specified engine state where fuel vapors occur more than a specified amount, and judging the idle speed control system functionally abnormal when said discrimination value is out of a critical range at a time after passage of a critical time period from engine start-up;

said critical period being initially specified for judging abnormalities of the idle speed control system for the engine out of said specified engine state and being extended when said specified engine state is discriminated.

4. An abnormality detection system as defined in claim 3, wherein said judging means further discriminates another specified engine state where the engine is apt to cause a change in speed, and expands said critical range initially specified for judging abnormalities of the idle speed control system for the engine out of said specified engine state when said other specified engine state is discriminated.

5. An abnormality detection system as defined in claim 4, wherein said specified engine state is defined by a cumulative vehicle mileage since shipment of the vehicle covering a specified critical mileage.

6. An abnormality detection system as defined in claim 5, wherein said judging means detects said discrimination value as said cumulative vehicle mileage and discriminates said specified engine state when said discrimination value exceeds a specified value.

7. An abnormality detection system as defined in claim 6, wherein said discrimination value is a learning value obtained from a plurality of said control values including a latest one of said control value.

8. An abnormality detection system for detecting abnormalities of an idle speed control system installed in a vehicle based on a deviation of an on-idle engine speed from a target engine speed while an engine runs idle, said abnormality detection system comprising:

a speed sensor for detecting an engine speed; and judging means for detecting a deviation of said engine speed from a target engine speed, judging whether the engine is in a lapped state where the engine is apt to cause a change in speed or in a green state where the engine is hardly changeable in speed, and judging the idle speed control system functionally abnormal when said deviation is out of a critical condition;

said critical condition being initially specified for judging abnormalities of the idle speed control system for said green state and being changed so as to make judgment of abnormalities of the idle speed control system harder to occur when the engine is in said lapped state than when in said green state.

9. An abnormality detection system as defined in claim 8, wherein said judging means interrupts the abnormality detection for a specified interruption period of time at engine start-up, detects an engine operating circumstance where vapors are apt to easily occur in fuel to be delivered to the engine, changes said specified interruption period of time longer when said engine operating circumstance is detected.

10. An abnormality detection system as defined in claim 8, wherein said judging means detects vehicle mileage since shipment of the vehicle and judges the engine to be in said lapped state when said vehicle mileage covers a specified critical mileage and to be in said green state when said vehicle mileage uncovers said specified critical mileage.

11. An abnormality detection system as defined in claim 8, wherein said judging means further detects an external load imposed on the engine during idling, and interrupts said abnormality judgment when said external load is detected.

12. An abnormality detection system as defined in claim 9, wherein said judging means detects vehicle mileage since shipment of the vehicle and judges the engine to be in said lapped state when said vehicle mileage covers a specified critical mileage and to be in said green state when said vehicle mileage uncovers said specified critical mileage.

13. An abnormality detection system as defined in claim 9, wherein said judging means further detects an external load imposed on the engine during idling, and interrupts said abnormality judgment when said external load is detected.

14. An abnormality detection system as defined in claim 10, wherein said judging means further detects an external load imposed on the engine during idling, and interrupts said abnormality judgment when said external load is detected.

* * * * *